United States Patent [19]

Yamamoto et al.

[11] Patent Number: 5,336,402
[45] Date of Patent: Aug. 9, 1994

[54] SEWAGE TREATMENT APPARATUS

[75] Inventors: Tatsuro Yamamoto; Yoshinao Kashino, both of Aichi, Japan

[73] Assignee: INAX Corporation, Tokoname, Japan

[21] Appl. No.: 905,398

[22] Filed: Jun. 29, 1992

[30] Foreign Application Priority Data

Jul. 18, 1991 [JP] Japan ................... 3-178047

[51] Int. Cl.⁵ .................. B01D 21/02; C02F 3/12
[52] U.S. Cl. .................. 210/194; 210/195.3; 210/197; 210/256; 210/262; 210/294; 210/259; 210/205; 210/534; 261/DIG. 75
[58] Field of Search ............... 210/256, 262, 294, 534, 210/535, 525, 257.1, 258, 259, 261, 205, 197, 194, 195.3; 261/DIG. 75

[56] References Cited

U.S. PATENT DOCUMENTS

| | | |
|---|---|---|
| 2,076,529 | 4/1937 | Durdin . |
| 3,173,866 | 3/1965 | Lefton . |
| 3,298,526 | 1/1967 | Valdespino . |
| 3,753,897 | 8/1973 | Ye-shih lin . |
| 3,941,698 | 3/1976 | Weis .................. 210/262 |
| 4,165,285 | 8/1979 | Wind .................. 210/197 |
| 4,251,371 | 2/1981 | Bauer .................. 210/197 |
| 4,317,723 | 3/1982 | Rapp .................. 210/256 |
| 4,346,000 | 8/1982 | Van Drooge ........... 210/262 |
| 4,350,588 | 9/1982 | Tsubota .............. 210/262 |
| 4,576,720 | 3/1986 | Mandt ................ 210/262 |
| 4,663,054 | 5/1987 | O'Connell ............ 210/197 |
| 4,707,252 | 11/1987 | Durot ................. 210/197 |
| 4,818,393 | 4/1989 | Durot ................. 210/262 |

FOREIGN PATENT DOCUMENTS

| | | |
|---|---|---|
| 004934 | 10/1979 | European Pat. Off. . |
| 125235 | 11/1984 | European Pat. Off. . |
| 465043 | 1/1992 | European Pat. Off. . |
| 4-100596 | 4/1992 | Japan . |

*Primary Examiner*—Thomas M. Lithgow
*Attorney, Agent, or Firm*—Kanesaka & Takeuchi

[57] ABSTRACT

Disclosed is a sewage treatment apparatus formed of an aeration chamber; and a settling chamber, into which aerated water is introduced from the aeration chamber for sedimentation of sludges. In this apparatus, the settling chamber is disposed upwardly of the aeration chamber. A bottom portion of the settling chamber serves as a hopper unit having a surface tapered downwards to an opening for discharging the sludges. A washing water supply unit for flowing out the washing water for washing away the deposited sludges is provided towards the hopper unit.

13 Claims, 3 Drawing Sheets

SEWAGE TREATMENT APPARATUS

FIELD OF THE INVENTION AND RELATED ART STATEMENT

The present invention relates generally to a treatment tank for purging or purifying a sewage with aerobic bacteria and, more particularly, to a treatment tank including an aeration chamber and a settling chamber which are arranged up and down.

A purifying tank (purging tank) incorporates a flow rate adjusting chamber, an aeration chamber, a settling chamber and a sterilizing chamber which are sectioned therein. Problems inherent in the conventional purifying tank are such that the tank is of a lateral type and correspondingly large in terms of installation area; and the installation involves a large-scale foundation work. The conventional lateral purging tank requires large vacant space at its upper portion, so that it purges relatively a small amount of water for its large volume.

To obviate these problems, a sewage treatment apparatus in which the aeration chamber and the settling chamber are arranged up and down was proposed in Japanese Patent Application No. 214596/1990 (the invention titled [Vertical Type Purifying Apparatus], filed on Aug. 13, 1990) made by the present applicant.

In this vertical type purifying apparatus of the preceding application, an oblique partition unit is provided in the tank to form a settling chamber in its upper portion and an aeration chamber in its lower portion. At the same time, an area of an upper surface opening of the settling chamber is set large, whereas an area of an upper surface opening of the aeration chamber is set small. The sewage is supplied to the aeration chamber and undergoes a purifying process with the aerobic bacteria. The sewage is thereafter advected to the settling chamber. The treated water, which has been subjected to a solid-liquid separation therein, flows from the upper portion to the outside. Then, the solid-liquid separation of the treated water is facilitated by setting a large the area of the upper surface opening of the settling chamber. Association of bubbles floating on the upper surface is promoted by setting a small area of the upper surface opening of the aeration chamber. The thus constructed purifying apparatus is of such a vertical type such that the aeration chamber and the settling chamber are formed into one united body. Hence, this yields an advantage in which a small installation area may suffice.

The purifying apparatus of the preceding application presents a problem wherein the sludges deposited on the bottom of the settling chamber are hard to eliminate.

SUMMARY OF THE INVENTION

It is a primary object of the present invention to provide a sewage treatment apparatus capable of immediately discharging the sludges deposited on a hopper unit and performing its long-term operation with a stability.

It is another object of the present invention to provide a sewage treatment apparatus which is compact in construction and easy for installation work.

It is still another object of the present invention to provide a sewage treatment apparatus including a simple mechanism for supplying the washing water of the hopper and capable of readily supplying a sufficient amount of washing water at one time.

It is a further object of the present invention to provide a sewage treatment apparatus in which oxygen is supplied to the sewage at a high efficiency, and a sewage treatment efficiency is high.

It is a still further object of the present invention to provide a sewage treatment apparatus exhibiting a high BOD removing efficiency because of initial adsorption of a substrate to sludges within an inner cylinder.

A sewage treatment apparatus according to a first mode comprises: an aeration chamber; and a settling chamber, into which aerated water is introduced from the aeration chamber, used for sedimentation of sludges, wherein the settling chamber is disposed upwardly of the aeration chamber; a bottom portion of the settling chamber serves as a hopper unit having a surface tapered downwards to an opening for discharging the sludges; and a washing water supply unit for flowing out the washing water for washing away the deposited sludges is provided towards the hopper unit.

A sewage treatment apparatus according to a second mode further comprises, in the first mode, a vertically elongate cylindrical tank body constituting side peripheral surfaces of the settling chamber and the aeration chamber. The hopper unit is disposed in the middle of the tank body in the heightwise direction to thereby vertically section the tank body into the settling chamber and the aeration chamber.

A sewage treatment apparatus according to a third mode is arranged, in the first or second mode, such that the washing unit includes a head tank disposed upwardly of the settling chamber and a mechanism for washing away the deposited substances on the hopper unit by flowing out the water within the head tank towards the hopper unit.

A sewage treatment apparatus according to a fourth mode further comprises in the first or second mode: a cylindrical inner cylinder extending from a lower part of the hopper unit to the bottom of the aeration chamber; and an ejector for causing an gyrate eddy flow about the inner cylinder within the aeration chamber.

A sewage treatment apparatus according to a fifth mode further comprises, in the fourth mode, a sewage supply pipe for supplying the sewage into an interior of the inner cylinder.

In the sewage treatment apparatus according to the present invention, the aeration treated water aerated in the aeration chamber is introduced into the settling chamber, wherein the sludges are sedimented. The sedimented sludges flow down through the hopper unit and reach the sludge discharge port. The sludges are fed back to the aeration chamber from the sludge discharge port.

With a continuous operation of the apparatus, the sludges are deposited on the hopper unit. Then, the washing water is flowed out to the hopper unit periodically or in a proper time by operating a washing water supply unit, thereby washing away the sludges deposited on the hopper unit. The deposition of the sludges on the hopper unit is thus prevented, and therefore the stable operation can continue for a long period of time.

In the sewage treatment apparatus according to the second mode, the settling chamber and the aeration chamber are provided in the common tank body. Hence, the whole construction of the apparatus becomes compact, and the installation work is facilitated.

In the sewage treatment apparatus according to the third mode, the washing water is supplied to the hopper unit in such a manner that the washing waster drops down from the head tank. It is therefore possible to supply a sufficient amount of washing water to the whole of the hopper unit. Further, the power for flowing out the washing water to the hopper unit is unnecessary because of utilizing a water head difference with respect to the head tank.

In the sewage treatment apparatus according to the fourth mode, a residence time of bubbles increases, and oxygen is supplied into the sewage at a high efficiency.

In the sewage treatment apparatus according to the fifth mode, the sludge within the inner cylinder easily adsorbs the substrate. More specifically, according to the present invention, a sewage residence time in the inner cylinder is approximately 1-10 min and in particular 2-3 min. However, a sludge concentration within the inner cylinder is high, and a contact frequency between the sludge and the substrate of an organic substance or the like in the sewage is high. This therefore leads to such a state that the sludge easily initially adsorbs the substrate. In analysis of an effluent liquid from the inner cylinder, i.e., of ejector inflow water, there is obtained a BOD value which is smaller by approximately 20-40 than BOD of the sewage. It is inferred that this reduction quantity of BOD is attributed to the initial adsorption.

DESCRIPTION OF THE PREFERRED EMBODIMENT

The present invention will hereinafter be described in detail by way of an embodiment with reference to the drawings.

Figure 1:
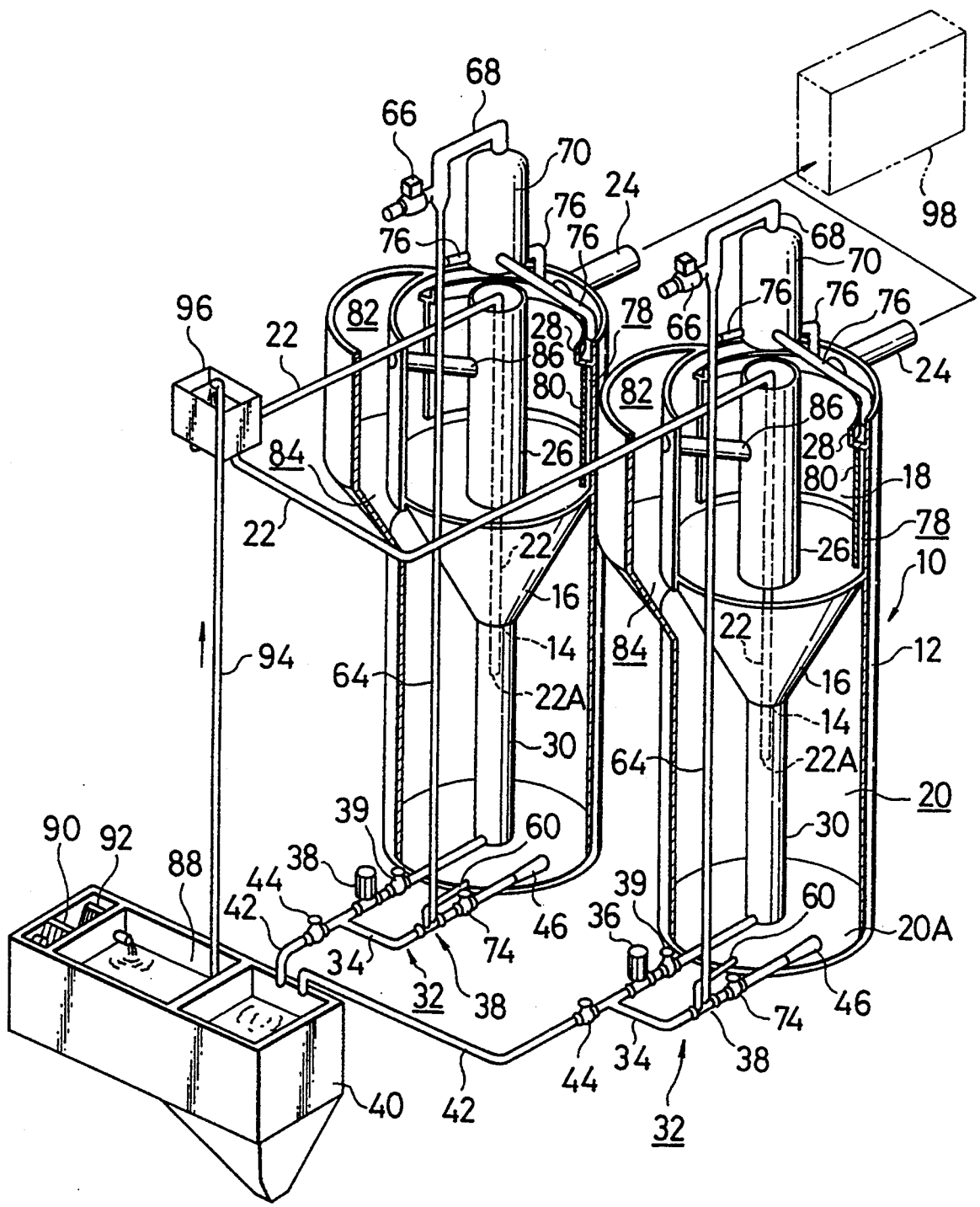
FIG. 1 is a perspective view with some portions cut away, showing one example of a sewage treatment tank according to the present invention.
Figure 2:
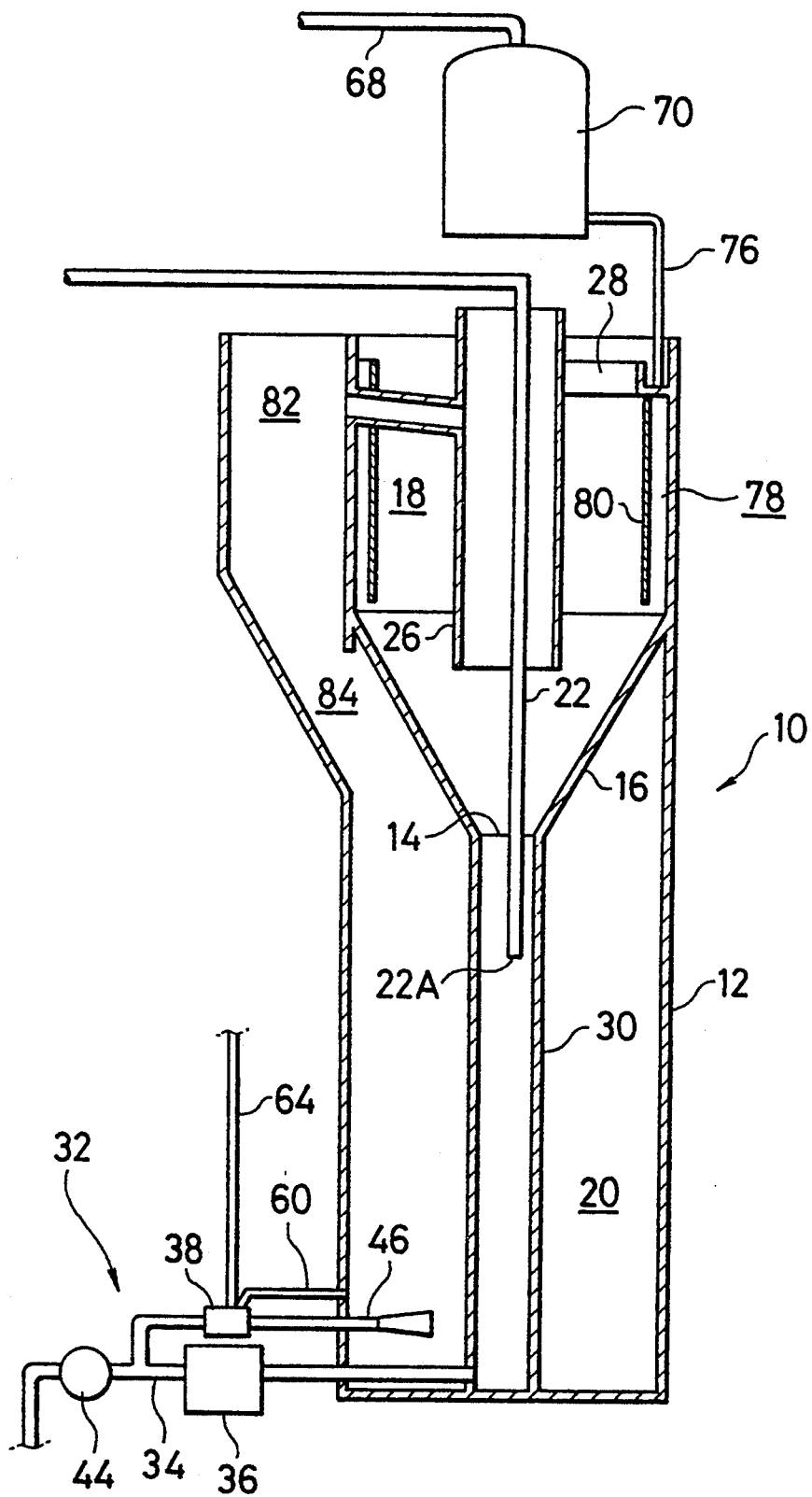
FIG. 2 is a vertical sectional view illustrating the sewage treatment tank shown in FIG. 1.

FIG. 1 shows one example of a sewage treatment apparatus 10 in the embodiment. Two tank bodies generally designated at 12 are disposed in parallel. This tank body 12 assumes a substantially vertically elongated cylindrical shape on the whole. An interior of this tank body 12 is sectioned up and down by a hopper 16 assuming an inverted conical configuration and formed with an opening 14 at its center. This opening functions as a discharge port for a sludge.

A settling chamber 18 is formed in an upper interior of the hopper 16, while an aeration chamber 20 is formed in a lower interior thereof. The settling chamber 18 accommodates a cylindrical center well 26 in its upper central portion in addition to a sewage supply pipe 22 and a treated water effluent portion 24. Note that an overflow weir 28 is provided along the upper internal peripheral surface of the settling chamber 18, and the treated water running over an upper edge of this overflow weir 28 flows into the effluent portion 24.

The aeration chamber 20 accommodates an inner cylinder 30 standing erect from a bottom 20A and communicating with the opening 14 of the hopper 16. The sewage supply pipe 22 is arranged in such a way that the pipe 22 is inserted from the upper portion of the settling chamber 18 and has a supply port 22A opened inwardly of the inner cylinder 30.

Provided in the vicinity of the bottom of the aeration chamber 20 is a circulation device 32 for jetting the sewage in the vicinity of the bottom within the aeration chamber 20 by sucking the sewage from the bottom of the inner cylinder 30 or from the vicinity of the bottom. This circulation device 32 includes a pipe 34, a pump 36 and an ejector 38 for mixing the air on the discharge side of the pump 36.

The pipe 34 is arranged to suck the sludge and sewage from the lower portion inwardly of the inner cylinder 30 and lead them to the ejector 38. A valve 39 is provided more upstream than the pump 36 in the middle of this pipe 34. A pipe 42 for drawing an extra sludge into a sludge condensing reservoir 40 branches off from the midpoint of the pipe 34. A valve 44 is provided in the middle of this pipe 42. Note that for the purpose of facilitating gyrations of the sewage within the aeration chamber 20, a spout pipe 46 connected to the ejector 38 is preferably positioned closer to an external wall than an intermediate portion between the inner cylinder 30 and an outer peripheral wall of the aeration chamber 20; and this pipe 46 is also preferably disposed such that a spouting direction therefrom is almost horizontal and perpendicular to the radial direction of the tank body 12 which passes through the tip of the spout pipe 46.

Figure 3:
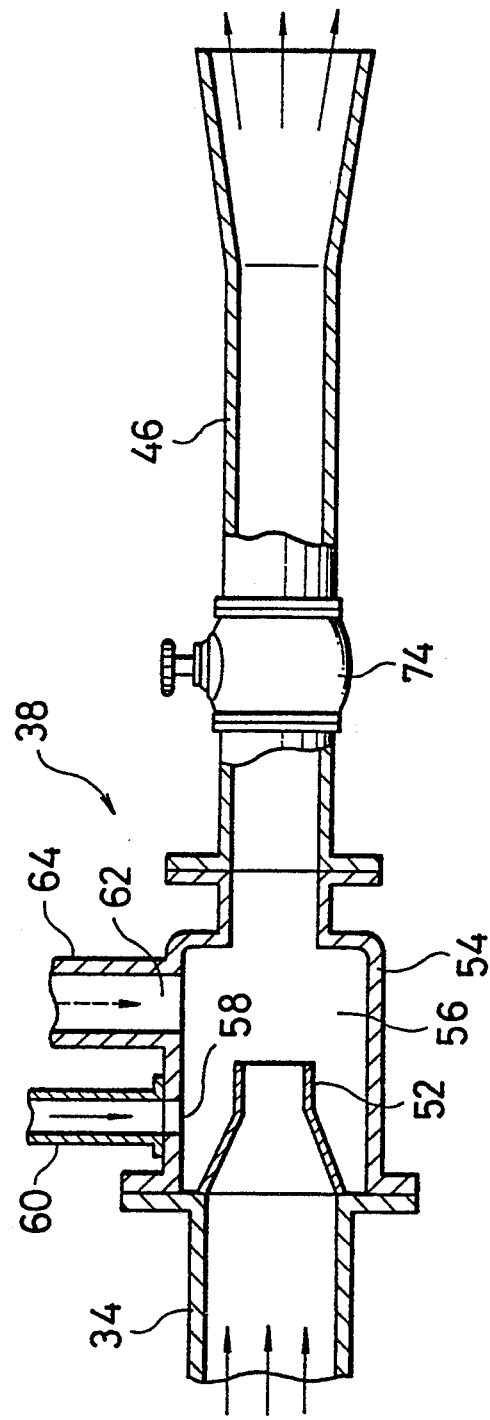
FIG. 3 is a sectional view showing one example of an ejector utilized in the present invention.

FIG. 3 is a sectional view fully illustrating the ejector 38. Indicated at 34 is a pipe, extending to communicate with the pump 36, to which a vena contracta nozzle 52 is connected. A casing 54 is provided to surround this vena contracta nozzle 52. A negative pressure chamber 56 is formed in an interior of this casing 54. This casing 54 is formed with a suction port 58 from which a suction pipe 60 extends. As illustrated in FIG. 1, this suction pipe 60 is connected to the lower portion of the tank body 12, whereby the water within the aeration chamber 20 can be sucked out.

The casing 54 is also formed with an air hole 62 to which a pipe 64 is connected. As depicted in FIG. 1, a vale 66 is provided at the tip of the pipe 64. Further, a pipe 68 branches off from the pipe 64 at a position closer to the ejector 38 than the valve 66. This pipe 68 is connected to the top of a head tank 70.

A bore diameter of the suction port 58 is selected so that a quantity of the water flowing in therefrom is approximately 1/10-1/20 as small as a quantity of air sucked from the air hole 62 into the negative pressure chamber 56.

The suction port 58 is provided more leftward than the tip of the vena contracta nozzle 52, i.e., on the more upstream side of a jet flow from the vena contracta nozzle 52. In regard to the position thereof, however, other positions may be selectable.

Note that the numeral 74 in the Figure represents a valve provided in the middle of the spout pipe 46.

The following is an explanation of the operation of this ejector.

The ejector 38 in this embodiment powerfully jets, from the vena contracta nozzle 52, water containing the sludge within the inner cylinder 30 at a high speed which has been fed from the pump 36. Then, the fluid within the negative pressure chamber 56 is involved in the jet flow and is discharged with the jet flow, thereby causing a negative pressure inwardly of the negative pressure chamber 56. Based on this negative pressure, air in the atmosphere is sucked into the negative chamber 56 via the valve 66, the pipe 64 and the air hole 62. Air is further jetted into the aeration chamber 20 via the spout pipe 46.

Besides, water within the aeration chamber 20 flows into the negative pressure chamber 56 via the suction port 58 at a rate of 1/10-1/20 as small as the suction air quantity. When a predetermined amount of water here flows into the negative pressure chamber 56 from the suction port 58, a conspicuous turbulent flow is caused within the negative pressure chamber 56 due to the jet flow from the vena contracta nozzle 52 and the high-speed air suction from the air hole 62. This promotes the negative pressure within the negative pressure chamber 56. For this reason, a much greater amount of air is powerfully sucked via the pipe 64 and the air hole 62. Besides, air is well mixed in the negative pressure chamber 56 and the discharge pipe 46 and then discharged.

Additionally, in the case of the ejector 38 in this embodiment, the suction port 58 is provided more upstream than the tip of the nozzle 52, and hence water sucked from the suction port 58 impinges on the nozzle 52, thereby further promoting the above-described turbulent flow.

The head tank 70 is disposed above the tank body 12; and a plurality of pipes 76 extends from the lower part of the head tank 70 as if octopus tentacles stretch.

A partition wall 80 is so formed along the inner peripheral surface of the tank body 12 as to provide a predetermined spacing (this spacing is hereinafter referred to as a narrow chamber) 78 from the inner peripheral surface of this tank body. An upper edge of this partition wall 80 is fixed to the overflow weir 28.

The pipes 76 extending from the head tank 70 communicate with the upper part of the this narrow chamber 78.

A bubble separation chamber 82 is formed along the outer peripheral portion of the settling chamber 18. This bubble separation chamber 82 communicates with the upper part of the aeration chamber 20 via a passage 84 at the bottom. An upper portion of the bubble separation chamber 82 communicates with the center well 26 through a communicating pipe 86.

The communicating pipe 86 for communicating the bubble separation chamber 82 with the center well 26 is disposed with a slight inclination to the center well 26. A gradient thereof is set preferably at 5°–10°. This intends to restrain an advection of rough bubbles aggregately produced in the separation chamber 82 to the center well 26.

Designated at 88 is a sewage reservoir into which the sewage flows through a rough screen 90 and a fine screen 92. The sewage is supplied to the respective tank bodies 12 via a sewage pipe 94, a distribution measuring tank 96 and the pipe 22.

In the sewage treatment apparatus constructed above, when actuating the pump 36, water containing sludge within the inner cylinder 30 is supplied to the ejector 38 and jetted substantially horizontally into the aeration chamber 20 from the spout pipe 46. The sewage rises with gyrations over the entire area of the aeration chamber 20.

The sewage jetted from the spout pipe 46 is mixed with a good deal of air bubbles by means of the ejector 38. The jetted bubbles spread all over the aeration chamber 20 while following up the sewage rising with gyrations. Besides, the bubbles jetted at the bottom rises with gyrations, and therefore it takes much time for the bubbles to reach the uppermost portion. Oxygen is supplied into the sewage at a high efficiency. Namely, a residence time of the bubbles is large, and hence an oxygen supply power is high. Ensured is a sufficient amount of oxygen supplied to aerobic bacteria. Therefore, according to the present invention, the aerobic bacteria is highly active over the entire area of the aeration chamber 20, and the sewage is surely purified.

The treated sewage which has reached the uppermost portion of the aeration chamber 20 flows into the bubble separation chamber 82 from the bottom, wherein the sewage is defoamed. The sewage, which has risen in the separation chamber 82, is subsequently advected via the communicating pipe 86 into the center well 26. Then, the treated sewage flows into the settling chamber 18 from the opening at the lower edge of the center well 26, whereby the sewage is separated into treated water and precipitated sludge. The treated water, which is reserved in an upper layer of the settling chamber 18 and corresponds to a supply quantity of the sewage, runs over the overflow weir 28 and flows out of the effluent portion 24. The treated water is fed to a high processing equipment 98 such as a sand filter layer and an activated carbon filter layer according to the necessity. The precipitated sludge is transferred from the hopper 16 into the inner cylinder 30 and fed back into the aeration chamber 20 by the ejector 38.

With a passage of operating time, the sludges are deposited on the upper surface of the hopper 16. Accordingly, water reserved in the head tank 70 is flowed into the narrow chamber 78 periodically or in a proper time. For causing this outflow, the open valve 66 is temporarily closed while the pump 36 goes on operating. Then, the negative pressure is applied to the head tank 70 through the pipes 64, 68. Water is resupplied to the head tank 70 from the lower portion of the settling chamber 18 via the narrow chamber 78 and the pipe 76. After the predetermined water has been resupplied to the head tank 70, and when the valve 66 is again opened, it follows that the atmospheric pressure is applied onto the water surface in the head tank 70 through the pipe 68. Water in the head tank flows into the narrow chamber 78 due to a water head difference between the head tank 70 and the narrow chamber 78. This water passes through the narrow chamber 78 and flows onto the upper surface of the hopper 16. The water then washes away the sludges deposited on the hopper 16 towards the opening 14.

Although the illustrative embodiment of the present invention has been described in detail with reference to the accompanying drawings, it is to be understood that the present invention is not limited to this embodiment. Various changes or modifications may be effected by one skilled in the art without departing from the scope or spirit of the invention.

What is claimed is:

1. A sewage treatment apparatus comprising:
   aeration chamber means including means to aerate the sewage;
   settling chamber means mounted to said aeration chamber means and vertically above the aeration chamber means and having means connected between the aeration chamber means and the settling chamber means for conducting aerated water from said aeration chamber means to said settling chamber means for sedimentation of sludges contained in the aerated water at the settling chamber means, said settling chamber means having means to discharge a clarified effluent therefrom, a bottom portion formed as hopper unit means having a surface tapered downwards to an opening for discharging the sludges and means to transfer said sludge to said aeration chamber means;

means for feeding a sewage influent in flow communication with said aeration chamber means; and washing water supply unit means situated above the settling chamber means for flowing out washing water for washing away the sludges deposited in the settling chamber means towards said hopper unit means.

2. The sewage treatment apparatus as set forth in claim 1, further comprising a vertically elongate cylindrical tank body constituting side peripheral surfaces of said settling chamber means and said aeration chamber means, said hopper unit means being disposed in the middle of said tank body in the heightwise direction to thereby vertically section said tank body into said settling chamber means and said aeration chamber means.

3. The sewage treatment apparatus as set forth in claim 1, wherein said washing water supply unit means includes a head tank disposed upwardly of said settling chamber means and means for washing away the deposited sludges in said settling chamber means by flowing out water within said head tank towards said hopper unit means.

4. The sewage treatment apparatus as set forth in claim 3, further comprising: a cylindrical inner cylinder extending from a lower part of said hopper unit means to a bottom of said aeration chamber means; and ejector means situated near the aeration chamber means and connected thereto for causing a gyrate eddy flow about said inner cylinder within said aeration chamber means.

5. The sewage treatment apparatus as set forth in claim 4, further comprising sewage supply pipe means for supplying sewage into an interior of said inner cylinder.

6. The sewage treatment apparatus as set forth in claim 1, further comprising overflow weir means provided along an upper internal peripheral surface of said settling chamber means in order to take out water from sludge mixed water introduced into said settling chamber means.

7. The sewage treatment apparatus as set forth in claim 4, further comprising a first pipe connected to said ejector means, said ejector means providing negative pressure for sucking air thereinto through the first pipe.

8. The sewage treatment apparatus as set forth in claim 7, wherein said first pipe includes a valve communicating with the atmosphere.

9. The sewage treatment apparatus as set forth in claim 8, further comprising a second pipe connected between said head tank and said first pipe at a side of said ejector means relative to said valve; and a third pipe connected between said head tank and an upper part of said hopper unit means within said settling chamber means, when closing said valve, negative pressure of said ejector means being transferred to said head tank so that water in said settling chamber means is sucked into said head tank and when opening said valve thereafter, atmospheric pressure being transferred to an interior of said head tank so that the water in said head tank flows out towards said hopper unit means.

10. The sewage treatment apparatus as set forth in claim 1, further comprising bubble separation chamber means provided aside of said settling chamber means, a lower part of said bubble separation chamber means communicating with said aeration chamber means and an upper part thereof communicating with an interior of said settling chamber means, the sludges with water in said aeration chamber means being introduced into said bubble separation chamber means and, after being deaired, flowing into said settling chamber means.

11. The sewage treatment apparatus as set forth in claim 10, wherein a cylindrical center well is provided at a central part of said settling chamber means; and an interior of said center well communicates with an interior of said bubble separation chamber means via a pipe having a downward gradient to said center well to prevent bubble from flowing into said center well.

12. The sewage treatment apparatus as set forth in claim 4, further comprising a pump for introducing water within said inner cylinder into said ejector means to produce a negative pressure in the ejector means.

13. The sewage treatment apparatus as set forth in claim 12, further comprising a pipe situated between a lower portion of the aeration chamber means and the ejector means, water in the lower portion within said aeration chamber means being sucked by the negative pressure produced in said ejector means.

* * * * *